(12) United States Patent
Tominaga et al.

(10) Patent No.: US 10,809,839 B2
(45) Date of Patent: Oct. 20, 2020

(54) TOUCH PANEL DISPLAY DEVICE

(71) Applicant: Sharp Kabushiki Kaisha, Sakai, Osaka (JP)

(72) Inventors: Masakatsu Tominaga, Sakai (JP); Yasuhiro Mimura, Sakai (JP); Tomofumi Kubota, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/630,878

(22) PCT Filed: Jul. 13, 2018

(86) PCT No.: PCT/JP2018/026552
§ 371 (c)(1),
(2) Date: Jan. 14, 2020

(87) PCT Pub. No.: WO2019/017301
PCT Pub. Date: Jan. 24, 2019

(65) Prior Publication Data
US 2020/0174607 A1 Jun. 4, 2020

(30) Foreign Application Priority Data
Jul. 19, 2017 (JP) .................................. 2017-139932

(51) Int. Cl.
*G06F 3/041* (2006.01)
*G02F 1/1333* (2006.01)
(Continued)

(52) U.S. Cl.
CPC ........ *G06F 3/0412* (2013.01); *G02F 1/13338* (2013.01); *G02F 1/134336* (2013.01);
(Continued)

(58) Field of Classification Search
CPC .... G06F 3/0412; G06F 3/044; G02F 1/13338; G02F 1/134336; G02F 1/134363;
(Continued)

(56) References Cited

U.S. PATENT DOCUMENTS 6,144,435 A * 11/2000 Yokoyama ........ G02F 1/133514
349/122
9,851,825 B2 * 12/2017 Kim ......................... G06F 3/044
(Continued)

FOREIGN PATENT DOCUMENTS

JP 2015-122057 A 7/2015

*Primary Examiner* — Peter D McLoone
(74) *Attorney, Agent, or Firm* — Keating & Bennett, LLP

(57) ABSTRACT

A touch panel display device is provided with an active matrix substrate having multiple pixels corresponding to N-number colors (N is an odd number of three or more). The active matrix substrate includes multiple source lines, multiple common electrodes, and multiple signal lines connected to the respective common electrodes. The active matrix substrate includes, outside its display area, a source line driving circuit, a common electrode driving circuit that supplies a predetermined voltage signal to the signal lines, source line connection portions that connect between the source lines and the source line driving circuit, signal line connection portions that connect between the signal lines and the common electrode driving circuit, and multiple outside-area dummy lines having predetermined potential. The source line connection portions of the source lines for the pixels of at least two adjacent colors are overlapped with each other, and the source line connection portions of the source lines for the pixels of the remaining color are overlapped with the signal line connection portions or the outside-area dummy lines.

7 Claims, 7 Drawing Sheets

(51) Int. Cl.
*G02F 1/1343* (2006.01)
*G02F 1/1362* (2006.01)
*G06F 3/044* (2006.01)
*G09G 3/36* (2006.01)

(52) U.S. Cl.
CPC .. *G02F 1/134363* (2013.01); *G02F 1/136286* (2013.01); *G06F 3/044* (2013.01); *G09G 3/3655* (2013.01); *G09G 3/3688* (2013.01); *G02F 2201/121* (2013.01); *G09G 2300/0413* (2013.01)

(58) Field of Classification Search
CPC ........ G02F 1/136286; G02F 2201/121; G09G 3/3655; G09G 3/3688; G09G 2300/0413
See application file for complete search history.

(56) References Cited

U.S. PATENT DOCUMENTS

| | | | |
|---|---|---|---|
| 9,910,329 B2* | 3/2018 | Kim | G09G 3/3688 |
| 10,168,819 B2* | 1/2019 | Noguchi | G06F 3/044 |
| 2015/0145821 A1* | 5/2015 | Kim | G06F 3/0412 |
| | | | 345/174 |
| 2015/0220204 A1* | 8/2015 | Noguchi | G06F 3/044 |
| | | | 345/174 |
| 2016/0070147 A1* | 3/2016 | Kim | G02F 1/136286 |
| | | | 345/96 |
| 2016/0253024 A1* | 9/2016 | Aoyama | G06F 3/0416 |
| | | | 345/174 |

* cited by examiner

TOUCH PANEL DISPLAY DEVICE

TECHNICAL FIELD

The invention disclosed below relates to a touch panel display device.

BACKGROUND ART

Japanese Unexamined Patent Application Publication No. 2015-122057 discloses a touch screen panel integrated display device provided with a panel serving as both a display panel and a touch screen. Multiple pixels are formed on the panel, and a pixel electrode and a transistor connected to the pixel electrode are provided for each pixel. In addition, the multiple electrodes are arranged on the panel so as to be apart from each other. The multiple electrodes function as common electrodes that form a lateral electric field (a horizontal electric field) with the pixel electrodes in a display drive mode and function as touch electrodes that form electrostatic capacitance with a finger or the like in a touch drive mode. At least one signal line substantially parallel to data lines is connected to each of the multiple electrodes and a touch driving signal or a common voltage signal is supplied to the electrode via the signal line.

In order to size down the frame of the touch screen panel integrated display device, such as the one disclosed in Japanese Unexamined Patent Application Publication No. 2015-122057, connection portions between multiple source lines and a source driver may be arranged so as to be overlapped with each other outside a display area. For example, among three source lines provided for pixels of three colors: R (red), G (green), and B (blue) (hereinafter referred to as an R pixel, a G pixel, and a B pixel, respectively), the connection portion between the source line and the source driver of the R pixel is arranged so as to be overlapped with the connection portion between the source line and the source driver of the G pixel. The connection portion between the source line and the source driver of the B pixel is arranged so as to be overlapped with the connection portion between a signal line connected to the touch electrode (the common electrode) and a controller that supplies predetermined voltage to the signal line.

The number of signal lines connected to the touch electrodes (the common electrodes) is often smaller than the number of source lines provided for the pixels of one color. Accordingly, part of the connection portions between the source lines and the source driver for the B pixels is not overlapped with the connection portions between the signal lines and the controller. As a result, load capacitances of the source lines for the B pixels are varied and luminance unevenness occurs when only blue is displayed.

It is an object of the invention disclosed below to provide a touch panel display device making the luminance unevenness less likely to occur.

SUMMARY OF INVENTION

A touch panel display device in one embodiment of the present invention is provided with an active matrix substrate having multiple pixels corresponding to N-number colors (N is an odd number of three or more). The active matrix substrate includes multiple source lines provided for the respective multiple pixels; multiple common electrodes; multiple signal lines connected to the respective multiple common electrodes; a source line driving circuit that is provided outside a display area and that supplies a data signal to the multiple source lines; a common electrode driving circuit that is provided outside the display area and that supplies a predetermined voltage signal to the multiple signal lines; multiple source line connection portions that connect between the multiple source lines and the source line driving circuit; multiple signal line connection portions that connect between the multiple signal lines and the common electrode driving circuit; and multiple outside-area dummy lines that are provided outside the display area and that has predetermined potential. The source line connection portions that are connected to the adjacent source lines provided for the pixels of at least two colors, among the multiple source lines, are arranged so as to be overlapped with each other. The source line connection portion that is connected to the source line provided for each pixel of the remaining color other than the at least two colors is arranged so as to be overlapped with one signal line connection portion or one outside-area dummy line.

With the above configuration, it is possible to make luminance unevenness less likely to occur.

DESCRIPTION OF EMBODIMENTS

Figure 1:
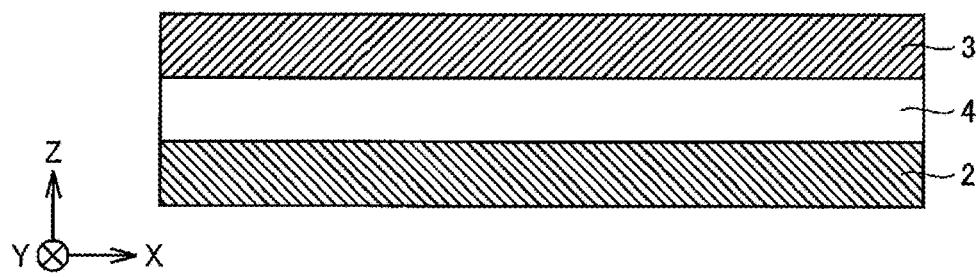
FIG. 1 is a schematic cross-sectional view of a touch panel display device in a first embodiment.

A touch panel display device in one embodiment is provided with an active matrix substrate having multiple pixels corresponding to N-number colors (N is an odd number of three or more). The active matrix substrate includes multiple source lines provided for the respective multiple pixels; multiple common electrodes; multiple signal lines connected to the respective multiple common electrodes; a source line driving circuit that is provided outside a display area and that supplies a data signal to the multiple source lines; a common electrode driving circuit that is provided outside the display area and that supplies a predetermined voltage signal to the multiple signal lines; multiple source line connection portions that connect between the multiple source lines and the source line driving circuit; multiple signal line connection portions that connect between the multiple signal lines and the common electrode driving circuit; and multiple outside-area dummy lines that are provided outside the display area and that has predetermined potential. The source line connection portions that are connected to the adjacent source lines provided for the pixels of at least two colors, among the multiple source lines, are arranged so as to be overlapped with each other. The source line connection portion that is connected to the source line provided for each pixel of the remaining color other than the at least two colors is arranged so as to be overlapped with one signal line connection portion or one outside-area dummy line (a first configuration).

With the first configuration, outside the display area, the source line connection portions of the source lines for the pixels of at least two colors that are adjacent to each other are arranged so as to be overlapped with each other, and the source line connection portions of the source lines for the pixels of the other colors are connected to the signal line connection portions of the signal lines connected to the common electrodes or the outside-area dummy lines. Accordingly, load capacitances of the source lines for the pixels of the respective colors are made less likely to vary, compared with a case in which the outside-area dummy lines are not provided, and luminance unevenness is made less likely to occur even when only a specific color is displayed.

In the first configuration, the active matrix substrate may further include multiple gate lines provided for the respective multiple pixels. The source line connected to one source line connection portion, among the source line connection portions of the respective adjacent source lines, may be configured so as to extend to the source line driving circuit and the other source line connection portion may be made of the same material as that of the gate lines, and the signal line connection portions and the outside-area dummy lines may be made of a material that is the same as that of either of the source lines and the gate lines and that is different from that of the source line connection portions arranged so as to be overlapped with the signal line connection portions and the outside-area dummy lines (a second configuration).

In the first or second configuration, the active matrix substrate may further include in-area dummy lines that are provided in the display area and that are connected to the outside-area dummy lines, and each in-area dummy line may be connected to any of the multiple common electrodes (a third configuration). With the third configuration, the outside-area dummy lines have the same potential as that of the common electrodes, that is, the same potential as that of the signal lines via the in-area dummy lines. Accordingly, the load capacitances of the source lines connected to the source line connection portions overlapped with the outside-area dummy lines or the signal line connection portions are made less likely to vary.

In the third configuration, the multiple common electrodes may be arranged in a matrix pattern, the common electrodes arranged in one column may be overlapped with the multiple in-area dummy lines, and the common electrode to which each of the multiple in-area dummy lines is connected may be any of the common electrodes arranged in the one column and all the multiple in-area dummy lines may not be connected to the same common electrode (a fourth configuration). With the fourth configuration, since the multiple in-area dummy lines overlapped with the common electrodes of one column are not connected to the same common electrode of the one column, it is possible to disperse the load on the common electrodes, compared with a case in which all the multiple in-area dummy lines are connected to the same common electrode.

In the third configuration, the common electrode to which each in-area dummy line is connected may be the common electrode closest to the outside-area dummy line to which the in-area dummy line is connected, among the multiple common electrodes (a fifth configuration). With the fifth configuration, since the in-area dummy lines are connected to the common electrodes closest to the outside-area dummy lines to which the in-area dummy lines are connected, it is possible to minimize the lengths of the in-area dummy lines to reduce the load on the common electrodes.

In the first or second configuration, the common electrode driving circuit may supply a voltage signal for touch detection or a voltage signal for image display as the predetermined voltage signal, the multiple outside-area dummy lines may be connected to the common electrode driving circuit, and the predetermined voltage signal may be supplied to the multiple outside-area dummy lines (a sixth configuration). With the sixth configuration, since the outside-area dummy lines receive the predetermined voltage signal from the common electrode driving circuit, the outside-area dummy lines have the same potential as that of the signal lines. Accordingly, the load capacitances of the source lines connected to the source line connection portions overlapped with the outside-area dummy lines or the signal line connection portions are made less likely to vary.

In the first or second configuration, the active matrix substrate may further include in-area dummy lines that are provided in the display area and that are connected to the outside-area dummy lines; and a common electrode line that is provided outside the display area, that is connected to the in-area dummy lines, and that is connected to the common electrode driving circuit (a seventh configuration). With the seventh configuration, since the same potential as that of the common electrodes is input into the in-area dummy lines via the common electrode driving circuit, the outside-area dummy lines have the same potential as that of the signal lines via the in-area dummy lines. Accordingly, the load capacitances of the source lines connected to the source line connection portions overlapped with the outside-area dummy lines or the signal line connection portions are made less likely to vary.

Embodiments of the present invention will herein be described in detail with reference to the drawings. The same reference numerals are used in the drawings to identify the same components or equivalent components and a description of such components is not repeated. The configuration may be simplified or schematically illustrated or part of the components may be omitted in the drawings referred to below for convenience. In addition, the ratios of the sizes of the components illustrated in the respective drawings do not necessarily indicate the actual ratios of the sizes thereof.

First Embodiment

FIG. 1 is a schematic cross-sectional view of a touch panel display device 1 in the present embodiment. The touch panel display device 1 in the present embodiment includes an active matrix substrate 2, an opposing substrate 3, and a liquid crystal layer 4 sandwiched between the active matrix substrate 2 and the opposing substrate 3. Each of the active matrix substrate 2 and the opposing substrate 3 is provided with a substantially transparent glass plate (having high transparency). In addition, the touch panel display device 1 is provided with a backlight provided in the direction of a face of the active matrix substrate 2, which is opposed to that of the liquid crystal layer 4, and a pair of deflector plates with which the active matrix substrate 2 and the opposing substrate 3 are sandwiched in FIG. 1, although the backlight and the deflector plates are not illustrated in FIG. 1. The opposing substrate 3 is provided with color filters of three colors: red (R), green (G), and blue (B) although the color filters are not illustrated in FIG. 1.

The touch panel display device 1 has a function to display an image and has a function to detect a position (a touch position) on the displayed image, which is touched by a user. This touch panel display device 1 is a so-called in-cell touch panel display device in which elements necessary to detect the touch position are provided on the active matrix substrate 2.

In addition, the touch panel display device 1 adopts a lateral electric field drive mode as a driving mode of liquid crystal molecules contained in the liquid crystal layer 4. In order to realize the lateral electric field drive mode, pixel electrodes and opposing electrodes (common electrodes) for forming the electric field are formed on the active matrix substrate 2. The configuration of the active matrix substrate 2 will now be specifically described.

Figure 2:
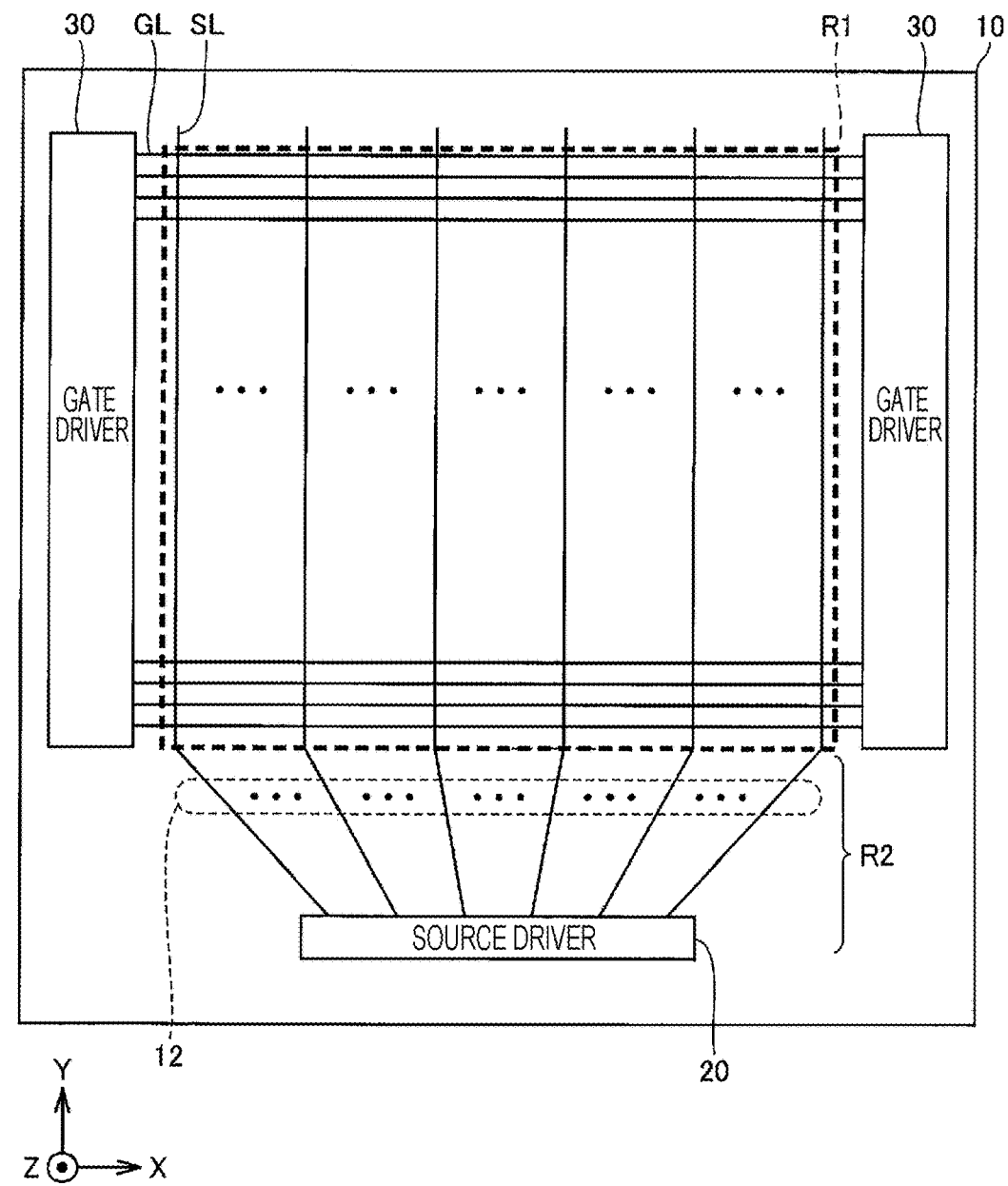
FIG. 2 is a plan view illustrating a schematic configuration of an active matrix substrate illustrated in FIG. 1.

FIG. 2 is a plan view illustrating a schematic configuration of the active matrix substrate 2. As illustrated in FIG. 2, the active matrix substrate 2 includes multiple gate lines GL, multiple source lines SL, a source driver 20, and gate drivers 30.

The pixel electrodes are provided in an area partitioned by the gate lines GL and the source lines SL on the active matrix substrate 2 to form pixels, although the pixel electrodes and the pixels are not illustrated in FIG. 2. Each pixel electrode corresponds to any color of R, G, and B of the color filters provided in the opposing substrate 3. The pixels for which the pixel electrodes corresponding to R are provided are hereinafter referred to as R pixels, the pixels for which the pixel electrodes corresponding to G are provided are hereinafter referred to as G pixels, and the pixels for which the pixel electrodes corresponding to B are provided are hereinafter referred to as B pixels.

The active matrix substrate 2 has a display area R1 composed of the respective pixels. In addition, the active matrix substrate 2 has a thin film transistor (TFT) (not illustrated) connected to one gate line GL, one source line SL, and the pixel electrode in each pixel.

The source driver 20 and the gate drivers 30 are provided outside the display area R1. The gate drivers 30 are provided outside the display area R1 and near both end portions of the gate lines GL and are connected to the respective gate lines GL. The gate drivers 30 sequentially scan the respective gate lines GL.

The source driver 20 is provided in a frame area R2 outside the display area R1 and at one end-portion side of the source lines SL. The source driver 20 is connected to the respective source lines SL in the frame area R2. The source driver 20 supplies a data signal for displaying an image to the respective source lines SL.

Connection portions between the source driver 20 and the respective source lines SL in the frame area R2 are hereinafter referred to as source line connection portions 12. The structure of the source line connection portions 12 in the frame area R2 will be described in detail below.

Figure 3:
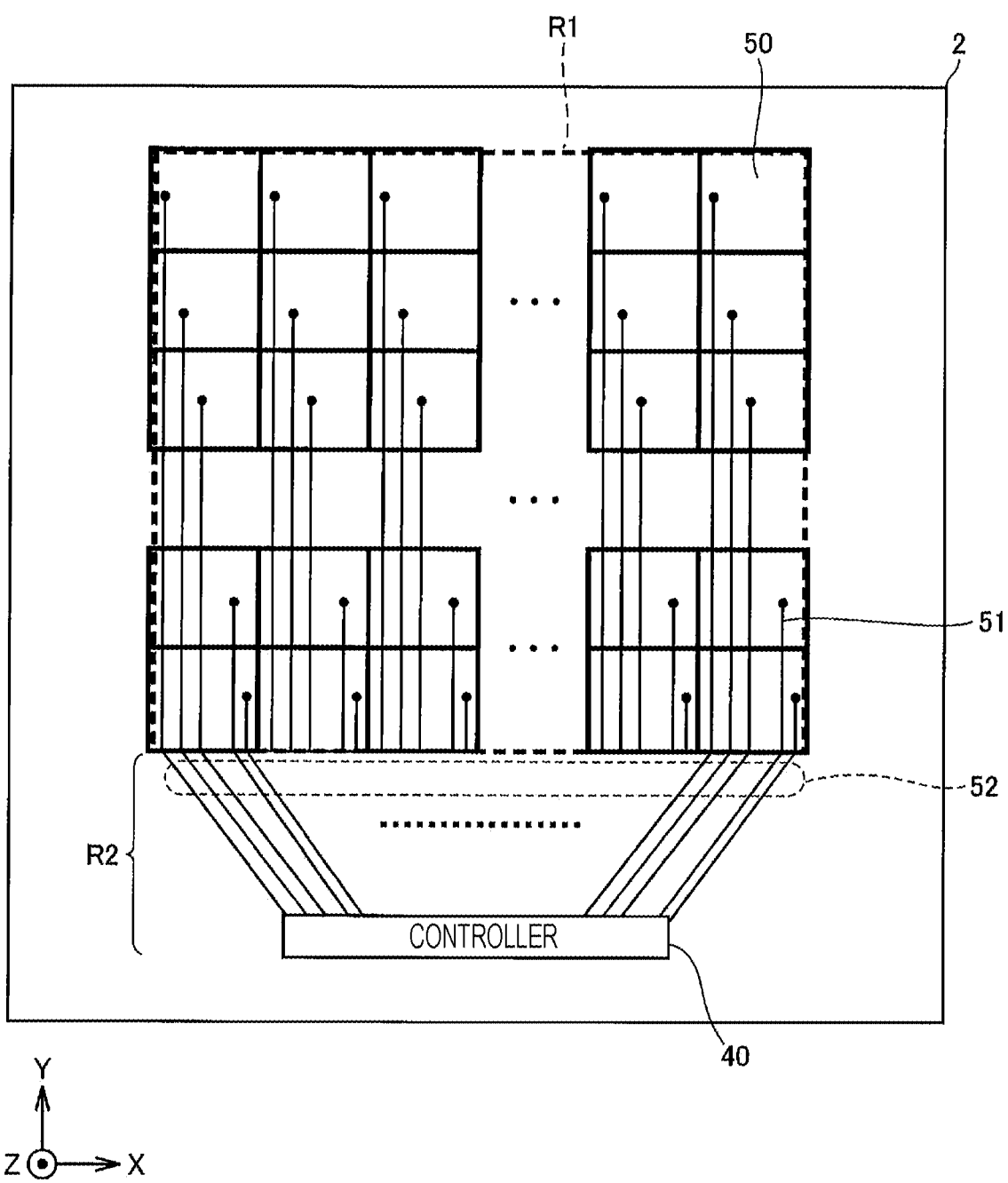
FIG. 3 is a plan view illustrating an example of the arrangement of opposing electrodes formed on the active matrix substrate illustrated in FIG. 2.

FIG. 3 is a schematic diagram illustrating an example of the arrangement of the opposing electrodes formed on the active matrix substrate 2. As illustrated in FIG. 3, each opposing electrode 50 has a rectangular shape and the multiple opposing electrodes 50 are arranged in a matrix pattern on the active matrix substrate 2. The opposing electrodes 50 are provided above the pixel electrodes (not illustrated) on the face at the liquid crystal layer 4 (refer to FIG. 1) side of the active matrix substrate 2. Each of the opposing electrodes 50 has a substantially square shape with, for example, a side length of several millimeters and is larger than each pixel. Slits (for example, of a width of several micrometers) for forming the lateral electric field with the pixel electrodes (not illustrated) are formed in the opposing electrodes 50, although the slits are not illustrated in FIG. 3.

The active matrix substrate 2 includes a controller 40 at the side of the frame area R2, at which the source driver 20 illustrated in FIG. 2 is provided. The controller 40 performs image display control for displaying an image and performs touch position detection control for detecting the touch position.

The controller 40 is connected to the respective opposing electrodes 50 with signal lines 51 extending in the Y-axis direction. In other words, the signal lines 51 of the same number as that of the opposing electrodes 50 are formed on the active matrix substrate 2. The signal lines 51 are made of the same material as that of the source lines SL (refer to FIG. 2) and are provided on the same layer as that of the source lines SL.

The connection portions between the signal lines 51 and the controller 40 in the frame area R2 are hereinafter referred to as signal line connection portions 52. The structure of the signal line connection portions 52 in the frame area R2 will be described in detail below.

The opposing electrode 50, which is paired with the pixel electrode (not illustrated), is used in the image display control and is also used in the touch position detection control. The controller 40 supplies predetermined voltage to the signal lines 51 to cause the opposing electrodes 50 to function as the common electrodes in the image display control and supplies a touch driving signal for detecting the touch position to the signal lines 51 in the touch position detection control.

Although parasitic capacitance is formed between the opposing electrode 50 and the adjacent opposing electrode 50 or the like, capacitance is formed with a finger of a person or the like when the finger of the person or the like touches the display screen of a display device 10 and, thus, electrostatic capacitance is increased. In the touch position detection control, the opposing electrode 50 receives the touch driving signal supplied through the signal line 51 and detects the variation in the electrostatic capacitance at the position of the opposing electrode 50 to detect the touch position. In other words, the signal line 51 functions as a line for transmitting and receiving the touch driving signal and a touch detecting signal.

The structures of the source line connection portions 12 and the signal line connection portions 52 in the frame area R2 will now be specifically described.

Figure 4:
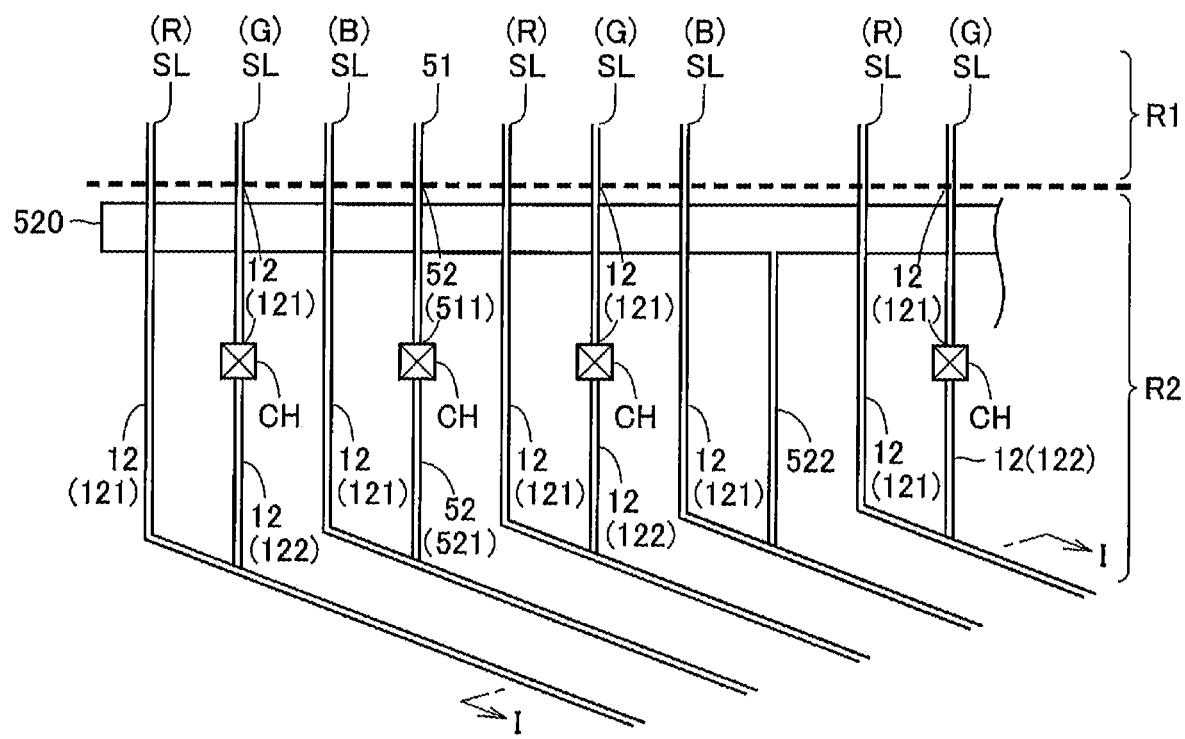
FIG. 4 is a schematic diagram resulting from enlargement of part of a frame area R2 illustrated in FIG. 3.

FIG. 4 is a schematic diagram resulting from enlargement of part of the frame area R2 including the boundary portion with the display area R1. (R), (G), and (B) described above the respective source lines SL in FIG. 4 indicate the colors of the color filters corresponding to the pixels for which the respective source lines SL are provided. In this example, the R pixel, the G pixel, and the B pixel are repeatedly arranged in this order in the direction in which the gate lines GL (refer to FIG. 2) extend. The source line SL of the R pixel is referred to as the source line SL (R), the source line SL of the G pixel is referred to as the source line SL (G), and the source line SL of the B pixel is referred to as the source line SL (B).

The source line connection portions 12 of the respective source lines SL are bent in the frame area R2. The source line connection portions 12 of the source lines SL (R) (hereinafter referred to as source line connection portions 12r) and the source line connection portions 12 of the source lines SL (B) (hereinafter referred to as source line connection portions 12b) each include an extended portion 121 resulting from extension of the source lines SL (R) or (B) to the frame area R2. In other words, the source line connection portions 12r are integrated with the source lines SL (R) and the source line connection portions 12b are integrated with the source lines SL (B).

The source line connection portions 12 of the source lines SL (G) (hereinafter referred to as source line connection portions 12g) each include the extended portion 121 resulting from extension of the source line SL (G) to the frame area R2 and a wiring portion 122 made of the same material as that of the gate lines GL. The extended portion 121 is connected to the wiring portion 122 via a contact hole CH.

The signal line connection portions 52 include an extended portion 511 resulting from extension of the signal line 51 to the frame area R2 and a wiring portion 521 made of the same material as that of the gate lines GL. The extended portion 511 is connected to the wiring portion 521 via a contact hole CH.

The source line connection portions 12 of the source line SL (R) and the source line SL (G), which are adjacent to each other, are overlapped with each other in the frame area R2. Specifically, the extended portion 121 of the source line SL (R) is arranged so as to be overlapped with the wiring portion 122 in the source line connection portion 12 of the source line SL (G) via an insulating film (not illustrated).

The source line connection portion 12 of the source line SL (B) is arranged so as to be overlapped with the wiring portion 521 in the signal line connection portion 52 of the adjacent signal line 51 via an insulating film (not illustrated).

The signal line 51 is arranged between the source line SL (B) and the source line SL (R). As described above, the number of the signal lines 51 is often smaller than the number of the source lines SL. Accordingly, a portion in which the signal line 51 is not provided exists between the source line SL (B) and the source line SL (R). Consequently, in the present embodiment, a COM line 520 made of the same material as that of the gate lines GL is provided near the boundary with the display area R1 in the frame area R2 and a dummy line 522 connected to the COM line 520 is provided in the portion in which the signal line 51 is not provided in the frame area R2.

The source line connection portion 12 of the source line SL (B) adjacent to the dummy line 522 is arranged so as to be overlapped with the dummy line 522 via an insulating film (not illustrated).

The COM line 520 is connected to the controller 40 (refer to FIG. 3). Predetermined voltage for image display or the touch driving signal for the touch position detection is supplied from the controller 40 to the COM line 520. The same potential as that of the signal lines 51 is supplied to the dummy line 522 through the COM line 520.

Figure 5:
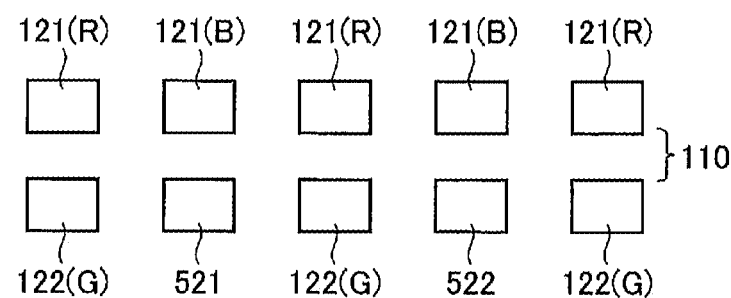
FIG. 5 is a cross-sectional view taken along the I-I line in FIG. 4.

FIG. 5 is a schematic cross-sectional view taken along the I-I line in FIG. 4. As illustrated in FIG. 5, the wiring portion 122 (G) in the source line connection portion 12 of the source line SL (G) is overlapped below the extended portion 121 (R) of the source line SL (R) via an insulating film 110. The wiring portion 521 in the signal line connection portion 52 of the signal line 51 or the dummy line 522 is overlapped below the extended portion 121 (B) of the source line SL (B) via the insulating film 110. Accordingly, load capacitances of the source lines SL (B) are not varied and luminance unevenness is less likely to occur when blue is displayed, compared with a case in which the dummy line 522 is not provided. It is sufficient for the source line connection portions 12 of the source line SL (R) and the source line SL (G) to be arranged so as to be overlapped with each other in at least part of them. In addition, it is sufficient for the dummy line 522 and the source line connection portion 12 of the source line SL (B) adjacent to the dummy line 522 to be arranged so as to be overlapped each other in at least part of them.

Since the wiring portion 521 and the dummy line 522 in the signal line connection portions 52 are made of the same material, the difference in delay between voltage signals, which is caused by the difference in the material, is less likely to occur, compared with a case in which the wiring portion 521 and the dummy line 522 in the signal line connection portions 52 are made of different materials.

Second Embodiment

The example is described in the first embodiment described above in which the COM line 520 provided in the frame area R2 is connected to the controller 40 to supply the same potential (predetermined voltage or the touch driving signal) as that of the opposing electrodes 50 to the dummy line 522. An example will be described in the present embodiment in which the same potential as that of the opposing electrodes 50 is supplied to the dummy line 522 with a configuration different from that in the first embodiment.

Figure 6:
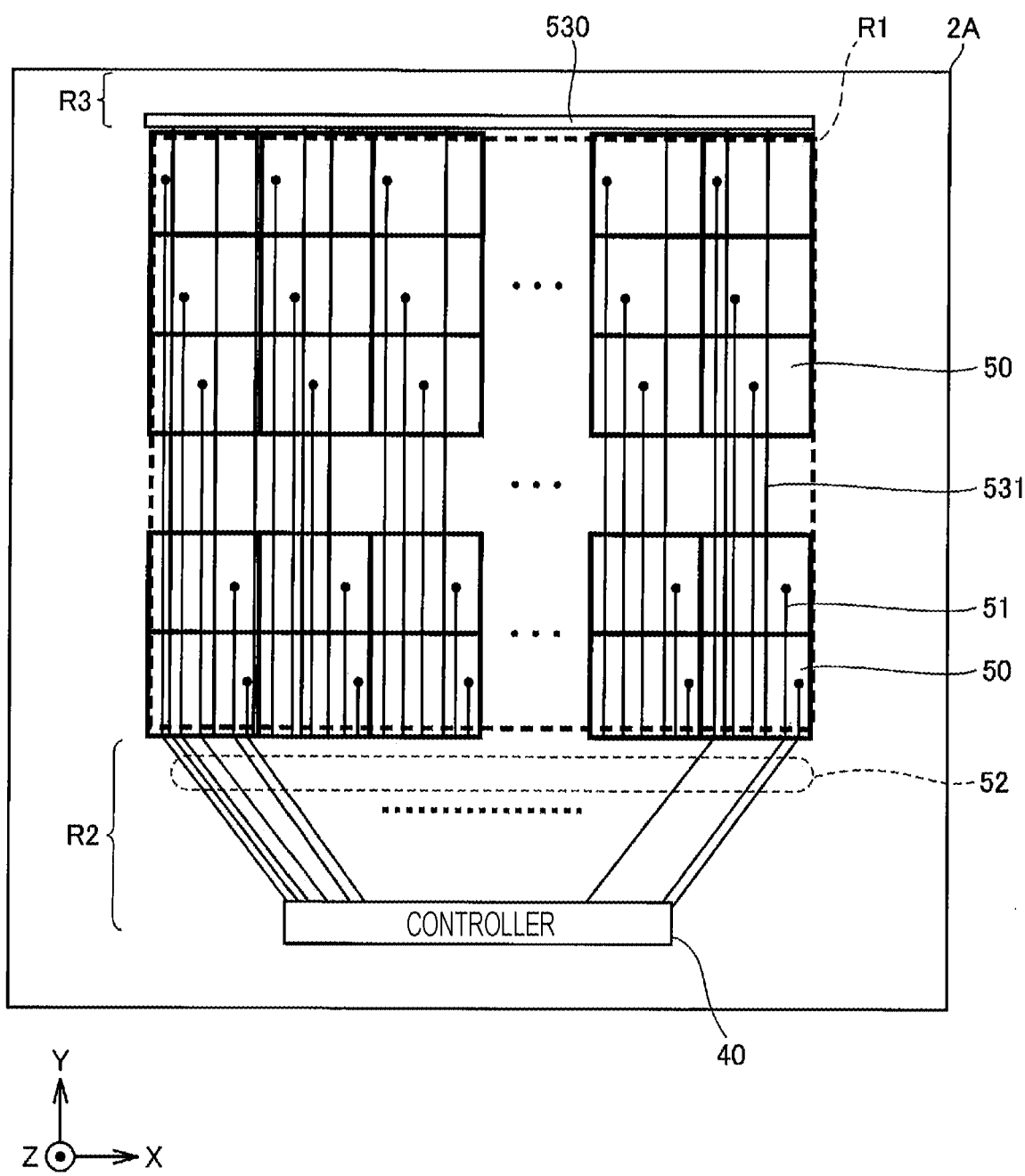
FIG. 6 is a plan view illustrating a schematic configuration of an active matrix substrate in a second embodiment.

FIG. 6 is a schematic diagram illustrating a schematic configuration of an active matrix substrate 2A in the present embodiment. The same reference numerals as those in the first embodiment are used in FIG. 6 to identify the same components as those in the first embodiment.

As illustrated in FIG. 6, in the active matrix substrate 2A, a COM line 530 is provided in a frame area R3 at the opposite side of the frame area R2. The active matrix substrate 2A includes lines 531 that are connected to the COM line 530 and that are arranged so as to be substantially parallel to the source lines SL (refer to FIG. 2) in the display area R1. The lines 531 in the display area R1 are hereinafter referred to as in-area dummy lines 531.

In this example, the COM line 530 is made of the same material as that of the gate lines GL, as in the COM line 520. The COM line 530 is connected to the controller 40 and the same potential as that of the opposing electrodes 50 is supplied to the COM line 530. The in-area dummy lines 531 are made of the same material as that of the source lines SL, as in the signal lines 51. The in-area dummy lines 531 are provided in portions in which no signal line 51 is provided between the adjacent source lines SL (B) and the adjacent source lines SL (R). The in-area dummy lines 531 are connected to the COM line 530 via contact holes (not illustrated) in the frame area R3.

Figure 7:
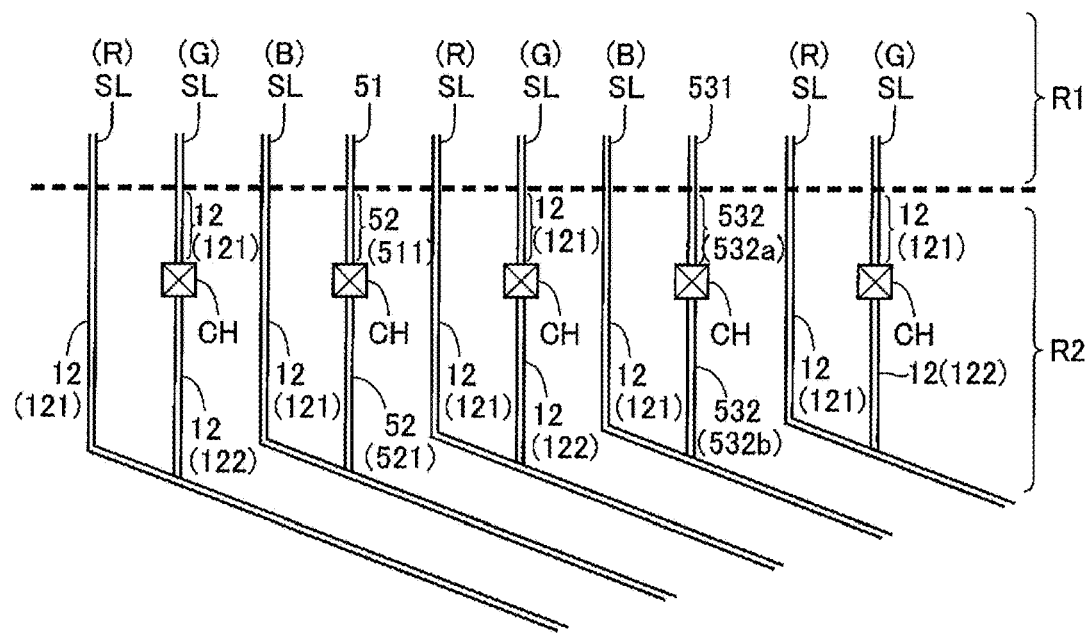
FIG. 7 is a schematic diagram resulting from enlargement of part of the frame area R2 illustrated in FIG. 6.

FIG. 7 is a schematic diagram resulting from enlargement of part of the frame area R2 in the present embodiment. The same reference numerals as those in the first embodiment are used in FIG. 7 to identify the same components as those in the first embodiment.

As illustrated in FIG. 7, in the present embodiment, a dummy line 532 (hereinafter referred to as an outside-area dummy line 532) connected to the in-area dummy line 531 is provided in the frame area R2. The outside-area dummy line 532 includes an extended portion 532a resulting from extension of the in-area dummy line 531 and a wiring portion 532b made of the same material as that of the gate lines GL. The extended portion 532a is connected to the wiring portion 532b via a contact hole CH. The wiring portion 532b of the outside-area dummy line 532 is overlapped with the extended portion 121 of the adjacent source line SL (B), as in the first embodiment.

Since the source driver 20, the controller 40, and so on are arranged in the frame area R2, it is difficult to arrange the COM line 520 in the frame area R2, as in the first embodiment, in order to reduce the width in the direction in which the source lines SL extend. In the second embodiment, the COM line 530 is arranged in the frame area R3 at the opposite side of the frame area R2 and the in-area dummy line 531 connected to the COM line 530 is connected to the outside-area dummy line 532. The same potential as that of the opposing electrodes 50 is supplied to the outside-area dummy line 532 through the in-area dummy line 531. Accordingly, the configuration of the second embodiment is useful for reducing the width in the direction in which the source lines SL extend in the frame area R2.

(First Modification)

Although the COM line 530 is provided in the frame area R3 in the second embodiment described above, only the in-area dummy lines 531 and the outside-area dummy lines 532 may be provided without the COM line 530. In this case, the in-area dummy lines 531 are connected to the opposing electrodes 50 that are overlapped with the in-area dummy lines 531 and that are closest to the controller 40, among the opposing electrodes 50 illustrated in FIG. 6. In other words, the in-area dummy lines 531 are connected to the opposing electrodes 50 closest to the outside-area dummy lines 532 connected to the in-area dummy lines 531.

With such a configuration, the same potential as that of the opposing electrodes 50 is capable of being supplied to the outside-area dummy lines 532 through the in-area dummy lines 531 and the lengths of the in-area dummy lines 531 are capable of being minimized. The loads of the in-area dummy line 531 on the opposing electrodes 50 connected to the in-area dummy lines 531 are increased with the increasing lengths of the in-area dummy lines 531 to increase the amounts of delay of the opposing electrodes 50. The difference in the amount of delay between the opposing electrodes 50 adjacent to each other is increased with the increasing amounts of delay, which may cause horizontal stripes. Accordingly, it is preferable to decrease the lengths of the in-area dummy lines 531 as much as possible.

Figure 8A:
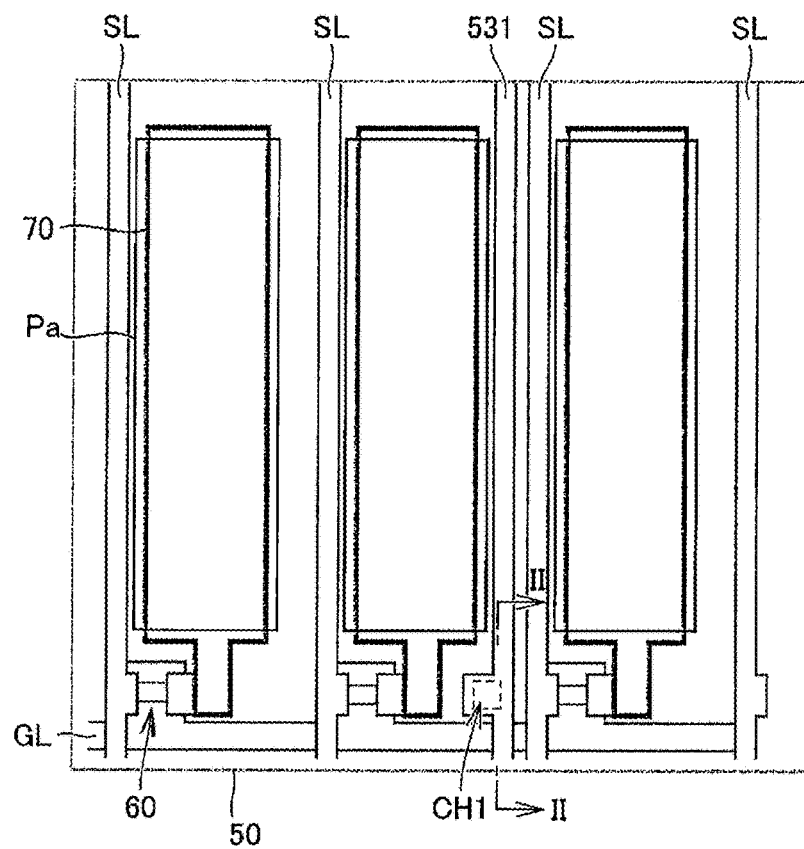
FIG. 8A is a plan view including a pixel for which an in-area dummy line is arranged in a modification of the second embodiment.

Here, a plan view including a pixel for which the in-area dummy line 531 is arranged is illustrated in FIG. 8A. As illustrated in FIG. 8A, each pixel includes the source line SL, a TFT 60 connected to the gate line GL, and a pixel electrode 70 connected to the TFT 60. The opposing electrode 50 is arranged so as to be overlapped with the pixel electrodes 70 and includes multiple slits (not illustrated) at positions overlapped with the pixel electrodes 70. The in-area dummy line 531 is arranged so as to be substantially parallel to the source line SL outside an opening Pa of the pixel and is connected to the opposing electrode 50 via a contact hole CH1. The structure of the connection portion between the in-area dummy line 531 and the opposing electrode 50 will now be specifically described.

Figure 8B:
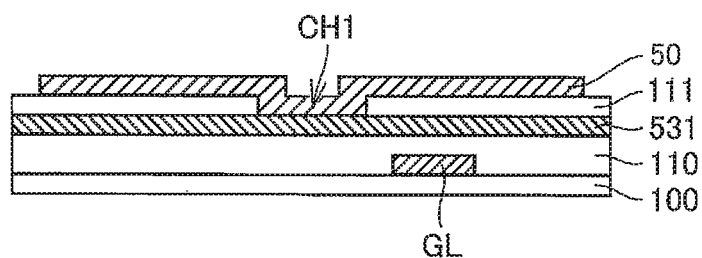
FIG. 8B is a cross-sectional view taken along the II-II line in FIG. 8A.

FIG. 8B is a cross-sectional view taken along the II-II line in FIG. 8A. As illustrated in FIG. 8B, the gate line GL and the insulating film 110 with which the gate line GL is covered are provided on a substrate 100 made of glass or the like having transparency. The in-area dummy line 531 is provided on the insulating film 110. Passivation films 111 are arranged on the in-area dummy line 531 so as to be apart from each other to form the contact hole CH1. The opposing electrode 50 is provided so as to cover the passivation films 111, and the opposing electrode 50 is connected to the in-area dummy line 531 via the contact hole CH1.

(Second Modification)

Although the example is described in the second embodiment described above in which the in-area dummy lines 531 are connected to the opposing electrodes 50 closest to the outside-area dummy lines 532 connected to the in-area dummy lines 531, the opposing electrodes 50 to be connected to the in-area dummy lines 531 are not limited to the above ones. In other words, it is sufficient for the in-area dummy lines 531 to be connected to any of the opposing electrodes 50 overlapped with the in-area dummy lines 531.

When the multiple in-area dummy lines 531 are connected to the same opposing electrode 50, the load capacitance applied on the opposing electrode 50 is increased. Accordingly, among the opposing electrodes 50 arranged in a matrix pattern, the multiple in-area dummy lines 531 arranged so as to be overlapped with the opposing electrodes 50 of the same column may be dispersedly connected to the opposing electrodes 50 of the same column so that the multiple in-area dummy lines 531 are not intensively connected to one opposing electrode 50. In this case, among the opposing electrodes 50 of the same column, the multiple in-area dummy lines 531 provided in the same column are sequentially connected to the opposing electrodes 50 closer to the outside-area dummy lines 532. With such a configuration, it is possible to decrease the lengths of the in-area dummy lines 531 as much as possible to suppress the increase in the load capacitance of the in-area dummy lines 531.

Third Embodiment

The example is described in the first embodiment described above in which the COM line 520 connected to the controller 40 is provided in the frame area R2 and the dummy line 522 is connected to the COM line 520. In the present embodiment, a configuration without the in-area dummy lines 531 and the COM line 520 will be described.

Figure 9:
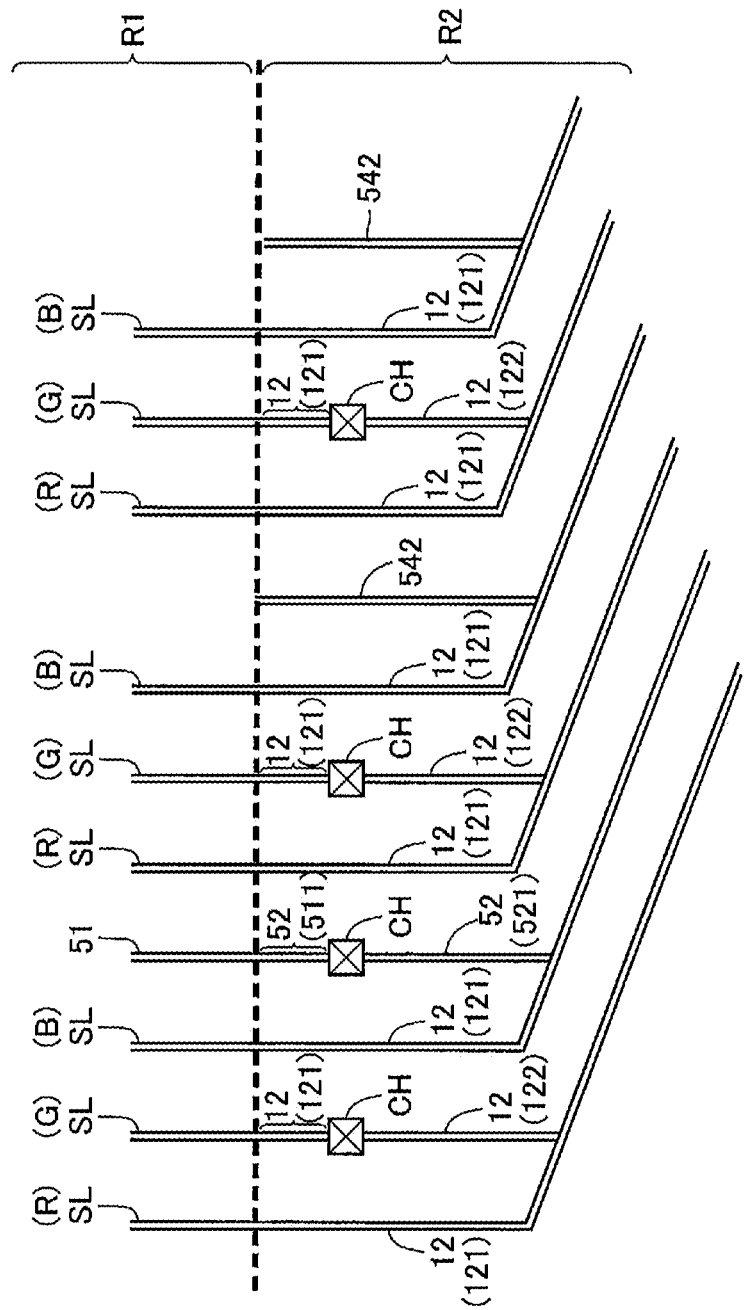
FIG. 9 is a schematic diagram resulting from enlargement of part of the frame area R2 in a third embodiment.

FIG. 9 is a schematic diagram resulting from enlargement of part of the frame area R2 in the present embodiment. As illustrated in FIG. 9, dummy lines 542 in the present embodiment extend to the boundary with the display area R1. The dummy lines 542 are made of the same material as that of the gate lines GL and are overlapped with the extended portions 121 of the source lines SL (B).

Each dummy line 542 is connected to a terminal portion (not illustrated) connected to the controller 40 (refer to FIG. 3), and predetermined voltage for image display or the touch driving signal for the touch position detection is supplied from the controller 40 to the dummy line 542 through the terminal portion (not illustrated). With this configuration, the dummy lines 542 have the same potential as that of the signal lines 51 and the load capacitances of the source lines SL (B) are less likely to vary.

Although the examples of the touch panel display device according to the present invention are described above, the touch panel display device according to the present invention does not limitedly have the configurations of the embodiments described above and may have various modified configurations. Modifications of the configuration of the touch panel display device will now be described.

(1) In the embodiments described above, the source line connection portions 12 of the source lines SL (G), the signal line connection portions 52, the dummy lines 522 and 542, and the outside-area dummy lines 532 may be made of the same material as that of the source lines SL. In this case, in the source line connection portions 12 of the source lines SL (R) and the source lines SL (B), portions overlapped with any of the source line connection portions 12 of the source lines SL (G), the signal line connection portions 52, the dummy lines 522 and 542, and the outside-area dummy lines 532 may be made of the same material as that of the gate lines GL. In other words, it is sufficient for the wiring portions overlapped with each other in the frame area R2 to be made of different materials.

(2) The example is described above in which the active matrix substrates in the embodiments described above have the pixels of the three colors: R, G, and B, the active matrix substrates in the embodiments described above may have the pixels of colors of an odd number of three or more, such as five colors or seven colors. For example, in the case of the pixels of five colors, the source line connection portions 12 of the two source lines SL for the pixels of two colors, which are adjacent to each other in the direction in which the gate lines GL extend, are overlapped with each other in the frame area R2. At this time, the portions that are overlapped in the two source line connection portions 12 are made of different materials. Specifically, in four source lines, among the five source lines SL corresponding to the pixels of the five colors, the source line connection portions 12 of the two respective adjacent source lines are overlapped with each other. The source line connection portion 12 of one source line SL corresponding to the pixel of the remaining one color is overlapped with the signal line connection portion 52 or the dummy line. At this time, the two source line connection portions 12 and the portion overlapped with the signal line connection portion 52 or the dummy line are made of different materials.

(3) Although the example is described in the embodiments described above in which the source line connection portions 12 of the source lines SL (B) for the B pixels are arranged so as to be overlapped with the signal line connection portions 52 of the signal lines 51, the source line connection portions overlapped with the signal line connection portions 52 may be the source line connection portions of the source lines SL for the R pixels or the G pixels.

(4) In the embodiments described above, it is sufficient for the source line connection portions 12 of the two adjacent source lines SL to be arranged so as to be overlapped with each other in at least part of them. In addition, it is sufficient for the dummy lines (522, 542, 532) provided in the frame area R2 and the signal line connection portions 52 of the signal lines 51 adjacent to the dummy lines to be arranged so as to be overlapped in at least part of them.

The invention claimed is:

1. A touch panel display device provided with an active matrix substrate having a plurality of pixels corresponding to N-number colors (N is an odd number of three or more),
wherein the active matrix substrate includes
a plurality of source lines provided for the respective plurality of pixels;
a plurality of common electrodes;
a plurality of signal lines connected to the respective plurality of common electrodes;
a source line driving circuit that is provided outside a display area and that supplies a data signal to the plurality of source lines;
a common electrode driving circuit that is provided outside the display area and that supplies a predetermined voltage signal to the plurality of signal lines;
a plurality of source line connection portions that connects between the plurality of source lines and the source line driving circuit;
a plurality of signal line connection portions that connects between the plurality of signal lines and the common electrode driving circuit; and
a plurality of outside-area dummy lines that is provided outside the display area and that has predetermined potential,
wherein the source line connection portions that are connected to the adjacent source lines provided for the pixels of at least two colors, among the plurality of source lines, are arranged so as to be overlapped with each other, and
wherein the source line connection portion that is connected to the source line provided for each pixel of the remaining color other than the at least two colors is arranged so as to be overlapped with one signal line connection portion or one outside-area dummy line.

2. The touch panel display device according to claim 1, wherein the active matrix substrate further includes
a plurality of gate lines provided for the respective plurality of pixels,
wherein the source line connected to one source line connection portion, among the source line connection portions of the respective adjacent source lines, is configured so as to extend to the source line driving circuit and the other source line connection portion is made of the same material as that of the gate lines, and
wherein the signal line connection portions and the outside-area dummy lines are made of a material that is the same as that of either of the source lines and the gate lines and that is different from that of the source line connection portions arranged so as to be overlapped with the signal line connection portions and the outside-area dummy lines.

3. The touch panel display device according to claim 1, wherein the active matrix substrate further includes
in-area dummy lines that are provided in the display area and that are connected to the outside-area dummy lines, and
wherein each in-area dummy line is connected to any of the plurality of common electrodes.

4. The touch panel display device according to claim 3, wherein the plurality of common electrodes is arranged in a matrix pattern,
wherein the common electrodes arranged in one column are overlapped with the plurality of in-area dummy lines, and
wherein the common electrode to which each of the plurality of in-area dummy lines is connected is any of the common electrodes arranged in the one column and all the plurality of in-area dummy lines are not connected to the same common electrode.

5. The touch panel display device according to claim 3, wherein the common electrode to which each in-area dummy lines is connected is the common electrode closest to the outside-area dummy line to which the in-area dummy line is connected, among the plurality of common electrodes.

6. The touch panel display device according to claim 1, wherein the common electrode driving circuit supplies a voltage signal for touch detection or a voltage signal for image display as the predetermined voltage signal, and
wherein the plurality of outside-area dummy lines is connected to the common electrode driving circuit, and the predetermined voltage signal is supplied to the plurality of outside-area dummy lines.

7. The touch panel display device according to claim 1, wherein the active matrix substrate further includes in-area dummy lines that are provided in the display area and that are connected to the outside-area dummy lines; and a common electrode line that is provided outside the display area, that is connected to the in-area dummy lines, and that is connected to the common electrode driving circuit.

\* \* \* \* \*